Patented Apr. 6, 1943

2,315,856

UNITED STATES PATENT OFFICE 2,315,856

MANUFACTURE OF RUBBER

Louis H. Howland, Cheshire, Conn., assignor to United States Rubber Company, New York, N. Y., a corporation of New Jersey No Drawing. Application April 9, 1940, Serial No. 328,681

3 Claims. (Cl. 260—763)

This invention relates to improvements in the technique of processing high carbon black-rubber mixes prior to vulcanization thereof.

The technique of processing high carbon black-rubber mixes prior to vulcanization thereof, whereby to obtain vulcanizates with improvements in physical and chemical properties, is described in Gerke et al. U. S. P. 2,118,601. The improved vulcanizates prepared by this technique differ from the usual vulcanizates produced by older techniques in that they have relatively (1) lower modulus at low elongation, (2) high resistance to abrasion, (3) higher modulus above 300% elongation, (4) low torsional hysteresis, (5) high electrical resistivity, and are (6) relatively softer.

These aforesaid vulcanizates are obtained by incorporating in the rubber a relatively large amount of carbon black, for example, at least 25 parts, and preferably at least 40 parts in the case of the tire treads, by weight of carbon black per 100 parts by weight of rubber, and then subjecting a substantially homogeneous mixture of the ingredients to a heat treatment at a temperature substantially above 250° F., the preferred temperatures being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to get the desired effects of heat treatment in a shorter period of time, and to provide an agent or promoter to speed up the process of attainment of the desired properties during the technique of processing described in U. S. 2,118,601. I have discovered that the heating operation can be materially shortened by adding to the mixture of rubber and carbon black, prior to the heat treatment a class of chemicals capable of facilitating the said process, viz., quinone oximes and their tautomers, that is, aromatic nitroso compounds that exhibit tautomerization to the quinone oxime form. The essential grouping is —O—N=A=, wherein N is nitrogen, O is oxygen, and A is any quinonoid nucleus. Preferred compounds are those subscribing to the formula Y—O—N=A=R, wherein Y is hydrogen, a hydrocarbon or substituted hydrocarbon group, a heterocyclic group, an acidyl group, a salt forming group such as metal, an ammonium or substituted ammonium group, etc.; R is the same as =N—O—Y, or oxygen, or sulphur, or an imide group (substituted or unsubstituted). The compounds having a paraquinoid structure and selected from the class consisting of the benzene and naphthalene series are preferred. The promoter increases the rate of increase of electrical resistivity in the process of U. S. P. 2,118,601.

The invention is further specifically illustrated with respect to the processing of tire tread compositions, it being understood that such compositions before they are vulcanized are to be subjected to the usual steps of shaping, manipulation and mounting attendant upon the manufacture of a vehicle tire, whether of the solid or pneumatic variety, and in which the final article embodies at least as its tread portion, the vulcanized composition of the invention.

In the following examples illustrating the invention, the "parts" are by weight and refer to parts per 100 parts of rubber.

Example 1

A master batch consisting of 100 parts of smoked sheet rubber, 55 parts of carbon black and 2.5 parts of pine tar was mixed on a mill with the mill roll temperature at about 150° F. for about 20 minutes until the carbon black was thoroughly incorporated. Higher mill temperatures may be used even up to 260° F. which is sometimes reached at the end of a ten minute Banbury cycle in factory master batching. This master batch was divided into two portions and, to one portion A, 0.6 part of p-nitroso phenol (quinone monoxime) was added on a cool mill and the milling continued until the chemical was thoroughly and substantially homogeneously incorporated. Also the other portion B which is the control containing no added chemical was milled for the same length of time.

Both mixes A and B were then milled 10 minutes at 300° F. After cooling at least five minutes these mixes were recovered, i. e. reduced to a viscosity suitable for milling in of further compounding ingredients, on a cool mill and the following ingredients were added by conventional mixing: 3.0 parts of zinc salt of cocoanut oil acids, 2.0 parts of Kadox brand zinc oxide, 1.0 part of mercaptobenzothiazole accelerator, 2.0 parts of acetone-diphenylamine reaction product (antioxidant) and 2.625 parts of sulfur. The stocks were vulcanized 60 and 90 minutes at 30 pounds steam pressure and the vulcanized stocks showed the following properties:

|  | Cure | A |  | B |  |
|---|---|---|---|---|---|
| Tensiles (lbs./sq. in.) and per cent elongation at break. | 60 mins___ | 4187 | 460 | 3965 | 520 |
|  | 90 mins___ | 3928 | 430 | 4141 | 520 |
| Torsional hysteresis (at 280° F.). | 90 mins___ | .073 |  | .139 |  |
| Electrical resistivity (Log R). | 60 mins___ | >12 |  | 7.2 |  |
|  | 90 mins___ | >12 |  | 6.9 |  |
| Abrasion and Adams hardness. | 60 mins___ | 149 | 36 | 133 | 35 |
|  | 90 mins___ | 153 | 35 | 136 | 28 |

A has lower hysteresis, higher electrical resistivity, and higher abrasion resistance than control B. U. S. P. 2,118,601 has shown that a stock of the type of control B will give results similar to A if the rubber-carbon black master batch is milled long enough at 300° F. or above in preparing the stock. However, the time required is longer than the ten minute period of master batch milling used in the present example. The fact that A shows better properties than control B after using only a ten minute milling period at 300° F. for the rubber-carbon black master batch, show that the use of the above chemical in the master batch has cut down the time required to attain the improvements in tread stocks of the type illustrated in U. S. P. 2,118,601.

*Example 2*

A master batch consisting of 100 parts of smoked sheet rubber, 55 parts of carbon black and 2 parts of pine tar was mixed in a conventional manner as set forth in Example 1 whereby the carbon black and rubber are thoroughly and substantially homogeneously mixed. This master batch was divided into two portions and, to one portion A, was added 0.4 part of p-nitroso-diphenylamine in a conventional manner whereby the chemical is thoroughly and substantially homogeneously incorporated. The other portion B, containing no chemical, was given the same amount of milling.

Both mixes A and B were then milled 10 minutes at 300° F. After cooling at least five minutes, these mixes were recovered on a cool mill and the following ingredients were added by conventional mixing; 2.5 parts of zinc salt of cocoanut oil acids, 2.0 parts of Kadox zinc oxide, 4.0 parts of sulfur, 0.9 part of the reaction product of methylene aniline and butyraldehyde, and 2.0 parts of acetone-diphenylamine reaction product. The stocks were vulcanized 60 and 90 minutes at 45 pounds steam pressure and the vulcanized stocks showed the following properties:

|  | Cure | A |  | B |  |
|---|---|---|---|---|---|
| Tensiles (lbs./sq. in.) and per cent elongation at break. | 60 mins___ | 4067 | 470 | 4110 | 540 |
|  | 90 mins___ | 3959 | 460 | 3734 | 490 |
| Torsional hysteresis (at 280° F.). | 90 mins___ | .093 |  | .145 |  |
| Electrical resistivity (Log R). | 60 mins___ | 11.6 |  | 6.4 |  |
|  | 90 mins___ | 11.3 |  | 6.6 |  |
| Abrasion and Adams hardness. | 60 mins___ | 141 | 33 | 116 | 24 |
|  | 90 mins___ | 170 | 36 | 146 | 26 |

*Example 3*

A master batch consisting of 100 parts smoked sheet rubber, 55 parts of carbon black and 2.5 parts of pine tar was made by conventional milling as set forth in Example 1. This master batch was divided into three portions, and to one portion A was added 0.5 part of quinone monoxime acetate, and to a second portion B was added 0.9 part of the lead salt of quinone monoxime, by conventional milling. The third portion C containing no chemical was given the same amount of conventional milling.

These mixes, A, B and C, were then milled 10 minutes at 300° F. After cooling at leave five minutes these mixes were completed exactly as described in Example 1 and where cured in the same manner at 30 pounds steam pressure.

The resulting stocks showed the following properties:

|  | Cure | A |  | B |  | C |  |
|---|---|---|---|---|---|---|---|
| Tensiles (lbs./sq. in.) and per cent elongation at break. | 60 mins___ | 3840 | 480 | 4006 | 410 | 3476 | 510 |
|  | 90 mins___ | 3607 | 410 | 4106 | 440 | 3333 | 470 |
| Torsional hysteresis (at 280° F.). | 90 mins___ | 0.073 |  | 0.065 |  | 0.123 |  |
| Electrical resistivity (Log R). | 60 mins___ | 12 |  | >12 |  | 7.7 |  |
|  | 90 mins___ | 11.8 |  | >12 |  | 7.5 |  |
| Abrasion and Adams hardness. | 60 mins___ | 150 | 38 | 148 | 36 | 132 | 39 |
|  | 90 mins___ | 147 | 36 | 147 | 35 | 137 | 35 |

*Example 4*

An example in which the heating is conducted in a heater in an atmosphere of steam at 50 pounds pressure instead of on the mill is as follows:

A rubber-carbon black-softener master batch was prepared in conventional manner. To a portion A of this master batch was incorporated 0.25 part of p-quinone dioxime per 100 parts of rubber. A portion B without added chemical was used as a control.

Mix A was heated 30, 60, 90 and 120 minutes while mix B was heated 120 minutes in a heater in steam at 50 pounds pressure.

These mixes were recovered on a cool mill and the additional ingredients for a tread mix were added in conventional manner.

In mix A, due to the activating effect of the chemical, 0.75 of mercaptobenzothiazole-methylene aniline reaction product was used as accelerator while in B 1.0 part of this accelerator was used.

The mixes were vulcanized in the usual manner and the finished stocks showed the following properties:

|  | A |  |  |  | B |
|---|---|---|---|---|---|
|  | Time in steam at 50 lbs. | | | | |
|  | 30 mins. | 60 mins. | 90 mins. | 120 mins. | 120 mins. |
| Tensile strength: |  |  |  |  |  |
| 40 mins. at 45 lbs___ | 4215 | 4025 | 4070 | 3805 | 4195 |
| 80 mins. at 45 lbs___ | 3315 | 3325 | 3115 | 3285 | 3605 |
| Electrical resistivity (Log R) | >12 | >12 | >12 | >12 | 10 |
| Torsional hysteresis (at 280° F.) | 0.070 | 0.061 | 0.058 | 0.061 | 0.087 |
| Relative abrasion resistance | 117 | 120 | 121 | 121 | 119 |

The above results clearly show the effect of quinone dioxime in speeding up of the effect produced by heating a rubber carbon black master batch at elevated temperature before completing the mix in the usual fashion.

*Example 5*

An example showing the effect of various times of milling is as follows:

A master batch was made consisting of 100 parts of rubber, 55 parts of carbon black and 3.5 parts of pine tar. To a portion A of this master batch on a mill at 140° F. was incorporated 0.25 part of p-quinone dioxime per 100 parts of rubber. A portion B without added chemical was used as a control.

These mixes were then milled at 300° F. for 10, 20, 30 and 60 minutes. After cooling for at least 15 minutes, the mixes were recovered on a cool mill, and then the following ingredients were added: 5 parts of zinc oxide, 3.5 parts of zinc soap of cocoanut oil acids, 3.0 parts of sulfur and 1.0 part of formaldehyde aniline-mercaptobenzothiazole reaction product.

These mixes were cured 60 minutes at 30 pounds steam pressure and the finished stocks showed the following properties:

|  | Time of milling of master batch at 300° F. | A | B |
| --- | --- | --- | --- |
| Tensile strength (lbs./sq. in.) | 10 min | 4480 | 4300 |
|  | 20 min | 4320 | 4300 |
|  | 30 min | 4010 | 4340 |
|  | 60 min | 3880 | 4050 |
| Torsional hysteresis at 280° F | 10 min | .090 | 144 |
|  | 20 min | .074 | 104 |
|  | 30 min | .064 | 097 |
|  | 60 min | .055 | 073 |
| Electrical resistivity (Log R) | 10 min | 11.7 | 8.0 |
|  | 20 min | >12.1 | 10.0 |
|  | 30 min | >12.1 | 10.9 |
|  | 60 min | >12.1 | >12.1 |
| Grasselli abrasion and Shore hardness | 10 min | 140.5  59 | 178.0  62 |
|  | 20 min | 125.5  57 | 144.5  59 |
|  | 30 min | 111.5  58 | 139.5  59 |
|  | 60 min | 100.5  58 | 119.5  58 |

For given times of hot milling, A has lower hysteresis and higher electrical resistivity than control B, thus indicating better dispersion of carbon black for the former. Also, for given times of hot milling A shows better abrasion resistance than control B. If the hot milling is continued long enough, stock A and control B will reach substantially the same state as measured by the above properties. The advantage of stock A over stock B is that it reaches a given desirable state (as described in U. S. P. 2,118,601) in shorter length of time of hot milling than control B and in consequence, stock A using the chemical would be made desirable from a commercial viewpoint.

Electrical resistivity was determined by measuring the resistance of a specimen of known thickness (about 0.1 inch) placed between mercury electrodes, under a potential difference of 135 volts, using a sensitive galvanometer with an Ayrton shunt. In the tables of data herein, the logarithm (to base 10) of the specific electrical resistivity (ohm-cms.) is designated "Log R."

The torsional hysteresis represents the logarithmic decrement (base 10) of the observed amplitudes of successive oscillations of a torsion pendulum, measured at 280° F. (137.8° C.) with an apparatus consisting essentially of a torsion pendulum in which the sample of rubber tested supplies the restoring force when the pendulum is deflected. For further description of this testing see U. S. P. 2,118,601.

The abrasion resistance is expressed by figures which are inversely proportional to the amount of wear (reduction in thickness) effected during a fixed number of cycles on the United States Rubber Company abrasion testing machine. The machine is operated with the abrasive wheel rotating at 180 R. P. M. and with a total load on the sample of six pounds.

In the Grasselli abrasion test which is used in Example 5, the abrasion resistance is expressed in cubic centimeters of material removed per horse power hour. This test is described in A. S. T. M. Standards on Rubber Products for October 1935, pages 42 to 44.

The visible changes taking place in the hot milling method as described in the above examples are somewhat similar to those described in U. S. P. 2,118,601. However, the viscosity increase during high temperature treatment may even be greater. As the hot milling proceeds the mix finally begins to smooth out. The smoothing out need not necessarily be done on the hot mill but it may be subsequently carried out on a cool mill. In the steam process in which the mix is not milled during heating, smoothing out does not occur in the heater but is obtained upon the relatively cooler recovery mill.

Other chemicals included in the present invention are such chemicals as nitrosothymol, dinitrosothymol, 2-chloro quinone dioxime, dichloro quinone dioxime and other chlorine substituted quinone dioximes, o-quinone dioxime, naphtho-quinone dioxime, quinone dioxime diacetate, dimethyl ether of quinone dioxime, lead salt of quinone dioxime, p-nitroso-N-methyl aniline, p-nitroso acetanilide, N,N' bis-(4-nitroso-phenyl) ethylene diamine, etc.

The chemicals may also contain substituents such as alkyl, halogen, alkoxy, nitro, etc.

The invention is not limited to the amount of chemical, although the preferred amounts vary from 0.05 to 2.0 parts per one hundred parts of rubber.

The use of these chemicals is not limited to the purity of the chemical. The pure chemicals or crude reaction product from the preparation of these chemicals or admixtures of these chemicals with other chemicals or compositions may be used to speed up the heat treatment process.

The quinone oxime compounds may be added at any time during or preceding the heat treatment, that is, they may be added to the rubber before the carbon black, along with it or after the carbon black, and then the resulting master batch subjected to the heat treatment. It is understood that this is controlled within limits avoiding serious degradation of the rubber since it is known that either excessive milling of rubber in air or excessive heating at elevated temperatures of rubber tends to break down (degrade) the rubber molecules. Rubber vulcanizates made from degraded rubber have unusually low tensile strength, poor resistance to tear, and poor resistance to ageing. By the present invention the tensile strength of the resulting vulcanizates is not lowered more than 10% by the heat-treatment. Instead of heat treating on a mill, the heating may be conducted in a heater in an atmosphere of hot air, steam, nitrogen, or a mixture of air and steam, or in water, etc. Where heating is carried out in a medium such as steam or a mixture of air and steam, the stock is preferably heated while in thin layers, while the mixture is static, i. e. there is no mechanical agitation of the mix taking place, as distinguished from a masticating or milling operation. Also, in carrying out the invention the usual softeners and other ingredients, may be included, if desired, in the initial mixture of rubber, black and chemical for the purpose of softening the rubber and facilitating the admixture and distribution of the black therein, or for the purpose of improving the properties of the final vulcanizate; for example, such softeners as oils, tars, fatty acids, fatty acid soaps, and mineral rubber, may be added. The raw rubber may also be blended with reclaimed rubber in any proportions. The rubber used in the master batches may have been softened by any of the processes known to the art, such as heating in air, steam or mixtures thereof, or mastication in the presence of zinc oxide, zinc soaps, lead dioxides, or other types of plasticizing agents.

Whereas the invention is adaptable broadly to all kinds of black it is particularly concerned with what are known as rubber reinforcing blacks, which blacks are herein distinguishable from the so-called soft rubber blacks of larger particle size, which are non-reinforcing, and flocculable to a lesser extent by heat, and from blacks of extremely small particle size like paint black and ink black.

While the invention is particularly significant in relation to tire tread compositions, it is also applicable to the manufacture of any rubber products in which are desired the qualities of high abrasion resistance, toughness, flexibility, high electrical resistivity or low hysteresis, etc., such as footwear outsoles, pneumatic inner tubes, hose, belting, vibration-absorbing mountings, tank linings, etc.

The invention may be applied to the treatment of natural as well as artificially-prepared rubbers and rubber-like products in general which have properties in common with natural rubber whereby they may be adapted to the same commercial uses.

The use of these compounds is not limited as to the temperature, time, pressure, or method of vulcanization. Also vulcanizing agents other than sulfur may be used for the vulcanization of the compounds used. They may be used in rubber mixes subjected to mold cures, air cures, ammonia cures, submarine cures, steam cures, etc.

The promoters, as stated above, may be added before or during heat treatment, may be put into the rubber by mill incorporation, by impregnation, or otherwise.

Having thus described my invention, what I claim and desire to protect by Letters Patent is:

1. A process which comprises mixing rubber with a relatively large amount of carbon black, and a small amount of a para-quinone oxime compound comprising the group —O—N=A=, wherein N is nitrogen, O is oxygen, and A is any quinonoid nucleus, heating the mix to a temperature substantially above 250° F. and not above about 370° F. to severely flocculate the black, and thereafter masticating the mix to substantially completely disperse the flocculated black.

2. A process which comprises mixing rubber with a relatively large amount of carbon black, and a small amount of a para nitroso aromatic compound which exhibits tautomerism to the para quinone oxime form, heating the mix to a temperature substantially above 250° F. and not above about 370° F. to severely flocculate the black, and thereafter masticating the mix to substantially completely disperse the flocculated black.

3. A process which comprises mixing rubber with a relatively large amount of carbon black, and a small amount of a quinone dioxime compound, heating the mix to a temperature substantially above 250° F. and not above about 370° F. to severely flocculate the black, and thereafter masticating the mix to substantially completely disperse the flocculated black.

4. A process which comprises mixing rubber with a relatively large amount of carbon black, and a small amount of a para-quinone monoxime, heating the mix to a temperature substantially above 250° F. and not above about 370° F. to severely flocculate the black, and thereafter masticating the mix to substantially completely disperse the flocculated black.

5. A process which comprises mixing rubber with a relatively large amount of a rubber reinforcing black, and a small amount of a para-quinone oxime compound comprising the group —O—N=A=, wherein N is nitrogen, O is oxygen, and A is any quinonoid nucleus, heating the mix to a temperature substantially above 250° F. and not above about 370° F., and thereafter masticating the mix and completing incorporation of additional compounding ingredients and vulcanizing ingredients.

6. A process which comprises mixing rubber with a relatively large amount of carbon black, and a small amount of a quinone dioxime compound, heating the mix to a temperature in the range from about 300° F. to about 370° F., and thereafter masticating the mix and completing incorporation of additional compounding and vulcanizing ingredients.

7. A process which comprises mixing rubber with a relatively large amount of carbon black, and a small amount of a para-quinone monoxime, heating the mix to a temperature in the range from about 300° F. to about 370° F., and thereafter masticating the mix and completing incorporation of additional compounding and vulcanizing ingredients.

8. A process which comprises mixing rubber with a relatively large amount of carbon black and a small amount of p-quinone dioxime, heating the mix to a temperature substantially above 250° F. and not above about 370° F., and thereafter masticating the mix and completing incorporation of additional compounding ingredients and vulcanizing ingredients.

LOUIS H. HOWLAND.